United States Patent
Lunardhi et al.

(10) Patent No.: US 10,467,890 B2
(45) Date of Patent: Nov. 5, 2019

(54) SECURED SENSOR INTERFACE

(71) Applicant: Microsoft Technology Licensing, LLC, Redmond, WA (US)

(72) Inventors: Alfonsus D. Lunardhi, San Ramon, CA (US); Kumar V K N Mangipudi, Portland, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/154,795

(22) Filed: May 13, 2016

(65) Prior Publication Data

US 2017/0330449 A1    Nov. 16, 2017

(51) Int. Cl.
*G08B 29/16*    (2006.01)
*G08B 29/18*    (2006.01)
(Continued)

(52) U.S. Cl.
CPC .............. *G08B 29/16* (2013.01); *G08B 29/18* (2013.01); *H04L 63/08* (2013.01); *H04L 63/10* (2013.01);
(Continued)

(58) Field of Classification Search
CPC . G06F 21/10; H04L 63/0428; H04N 21/4405; G11B 20/00086; G11B 20/0021
(Continued)

(56) References Cited

U.S. PATENT DOCUMENTS 4,990,987 A    2/1991   Boucher et al.
6,321,172 B1   11/2001  Jakob et al.
(Continued)

FOREIGN PATENT DOCUMENTS

EP    0751403 A1    1/1997
WO    2004102959 A1    11/2004
WO    2016045027 A1    3/2016

OTHER PUBLICATIONS

Arnaudov, Vesselin, "Unified Management of Heterogeneous Sensor Networks in the Atlantis Framework", Retrieved on: Nov. 23, 2015 Available at: http://citeseerx.ist.psu.edu/viewdoc/download?doi=10.1.1.114.4300&rep=rep1&type=pdf.
(Continued)

*Primary Examiner* — Hai Phan
*Assistant Examiner* — Anthony D Afrifa-Kyei
(74) *Attorney, Agent, or Firm* — Alleman Hall Creasman & Tuttle LLP (57) ABSTRACT

Examples are disclosed that relate to the securing of a distributed sensor system. One example provides a security component configured to be communicatively coupled between a trusted element and a distributed sensor system. The security component includes a configuration table configured to store sensor configurations for the distributed sensor system, and a security controller configured to secure the configuration table by limiting access to the configuration table according to a selected security protocol. The security component further includes a feedback controller configured to receive signals from the distributed sensor system and send feedback instructions to the trusted element based at least on a comparison of the signals received from the distributed sensor system with values in the configuration table.

19 Claims, 6 Drawing Sheets

(51) Int. Cl.
*H04L 29/08* (2006.01)
*H04L 29/06* (2006.01)
*H04W 12/08* (2009.01)

(52) U.S. Cl.
CPC ............ *H04L 67/12* (2013.01); *H04L 67/125* (2013.01); *H04W 12/08* (2013.01)

(58) Field of Classification Search
USPC ..... 726/2, 4, 14, 21, 26, 27, 30; 713/1, 160, 713/171, 150, 193, 194, 189; 702/130, 702/68, 132, 188, 193, 104, 85; 709/221, 709/220
See application file for complete search history.

(56) References Cited

U.S. PATENT DOCUMENTS

| | | | |
|---|---|---|---|
| 6,542,846 B1 | 4/2003 | Miller et al. | |
| 6,701,272 B2 | 3/2004 | Cooper et al. | |
| 6,831,554 B2 | 12/2004 | Takehara | |
| 7,400,945 B2 | 7/2008 | Radhakrishnan et al. | |
| 8,188,860 B2 | 5/2012 | Haid | |
| 8,396,893 B2 | 3/2013 | Gaffga et al. | |
| 8,590,332 B2 | 11/2013 | Wyatt | |
| 8,756,438 B2 | 6/2014 | Devadas et al. | |
| 8,768,530 B2 | 7/2014 | Liang et al. | |
| 8,913,747 B2 | 12/2014 | Montenegro | |
| 9,008,993 B2 | 4/2015 | Rich et al. | |
| 9,088,597 B2 | 7/2015 | Cher et al. | |
| 9,465,368 B1* | 10/2016 | Mitter | G05B 1/00 |
| 2006/0001827 A1 | 1/2006 | Howell et al. | |
| 2006/0268512 A1 | 11/2006 | Foster, Sr. | |
| 2008/0252445 A1 | 10/2008 | Kolen | |
| 2010/0033318 A1 | 2/2010 | Tampke | |
| 2010/0070618 A1 | 3/2010 | Kim et al. | |
| 2012/0218187 A1 | 8/2012 | Stewart et al. | |
| 2012/0316455 A1* | 12/2012 | Rahman | G01C 22/006 600/547 |
| 2013/0205022 A1* | 8/2013 | Kagan | H04L 67/06 709/224 |
| 2014/0105246 A1 | 4/2014 | Andreev et al. | |
| 2014/0118931 A1 | 5/2014 | Hata | |
| 2014/0282866 A1* | 9/2014 | Jakobsson | H04L 63/08 726/3 |
| 2014/0283630 A1 | 9/2014 | Mourey et al. | |
| 2014/0328367 A1 | 11/2014 | Niederberger et al. | |
| 2015/0044964 A1* | 2/2015 | Khan | G06F 21/35 455/41.1 |
| 2015/0151131 A1 | 6/2015 | Huelskamp et al. | |
| 2015/0222669 A1* | 8/2015 | Gillon | G06F 21/00 726/1 |
| 2015/0281872 A1 | 10/2015 | Pierrel et al. | |
| 2016/0018799 A1* | 1/2016 | Gettings | G05B 15/02 700/19 |
| 2016/0161339 A1* | 6/2016 | Tan | G01J 5/0025 702/150 |
| 2016/0226845 A1* | 8/2016 | Kim | H04L 9/083 |
| 2016/0291615 A1* | 10/2016 | Zakaria | G05F 1/66 |
| 2016/0328577 A1* | 11/2016 | Howley | G06F 19/00 |
| 2017/0034701 A1* | 2/2017 | Miyamoto | H04W 4/70 |
| 2017/0052907 A1* | 2/2017 | Price, Jr. | G06F 21/72 |

OTHER PUBLICATIONS

Yalagandula, et al., "S3: A Scalable Sensing Service for Monitoring Large Networked Systems", In Proceedings of the SIGCOMM workshop on Internet network management, Sep. 11, 2006, 6 pages.
"IC Temperature Sensors Find the Hot Spots," Maxim Integrated Application Note 689, Available Online at http://pdfserv.maximintegrated.com/en/an/AN689.pdf, Feb. 21, 2002, 5 pages.
Rahmanikia, N. et al., "Exploring Efficiency of Ring Oscillator-Based Temperature Sensor Networks on FPGAs (Abstract Only)," Proceedings of the 2015 ACM/SIGDA International Symposium on Field-Programmable Gate Arrays, Available Online at http://dl.acm.org/citation.cfm?id=2689104, Feb. 22, 2015, 2 pages.
ISA European Patent Office, International Search Report and Written Opinion Issued in PCT Application No. PCT/US2017/031459, dated Jun. 29, 2017, WIPO, 12 Pages.

* cited by examiner

SECURED SENSOR INTERFACE

BACKGROUND

Electronic devices may be configured to operate under certain ranges of conditions. Operating outside of these ranges may affect device performance, or even lead to malfunction.

SUMMARY

Examples are disclosed that relate to the securing of a distributed sensor system. One example provides a security component configured to be communicatively coupled between a trusted element and a distributed sensor system. The security component includes a configuration table configured to store sensor configurations for the distributed sensor system, and a security controller configured to secure the configuration table by limiting access to the configuration table according to a selected security protocol. The security component further includes a feedback controller configured to receive signals from the distributed sensor system and send feedback instructions to the trusted element based at least on a comparison of the signals received from the distributed sensor system with values in the configuration table.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Electronic devices may include or otherwise communicate with various sensors for detecting environmental conditions, operating conditions, user inputs, and other detectable conditions. For example, a device may include one or more temperature sensors to detect operating temperatures that may be damaging to the device or uncomfortable to a user. In the event that such a temperature is reached, a controller may control device operation to mitigate the temperature, for example by shutting down the device.

However, the use of sensor information to control device operation may pose security risks. For example, if thermal limits or other sensor-related operating settings are maliciously changed, or if sensor signals are spoofed or hijacked, device operation and/or a user experience may be compromised. Further, individually configuring security for each sensor of a distributed sensor system of a device may be complex and potentially error-prone.

Accordingly, examples are disclosed that relate to providing a secured sensor interface to help address security concerns with a distributed sensor system. As described in more detail below, a security component may be disposed communicatively between a distributed sensor system and other device components, such that all communication with the distributed sensor system occurs via the security component. The security component is configured to authenticate the sources of communications sent to the sensor system from other computing device components (e.g. an application processor), and to permit the communication to occur when the communication is authenticated as being sent from a trusted element. Further, other security measures also may be applied, as described below.

Figure 1:
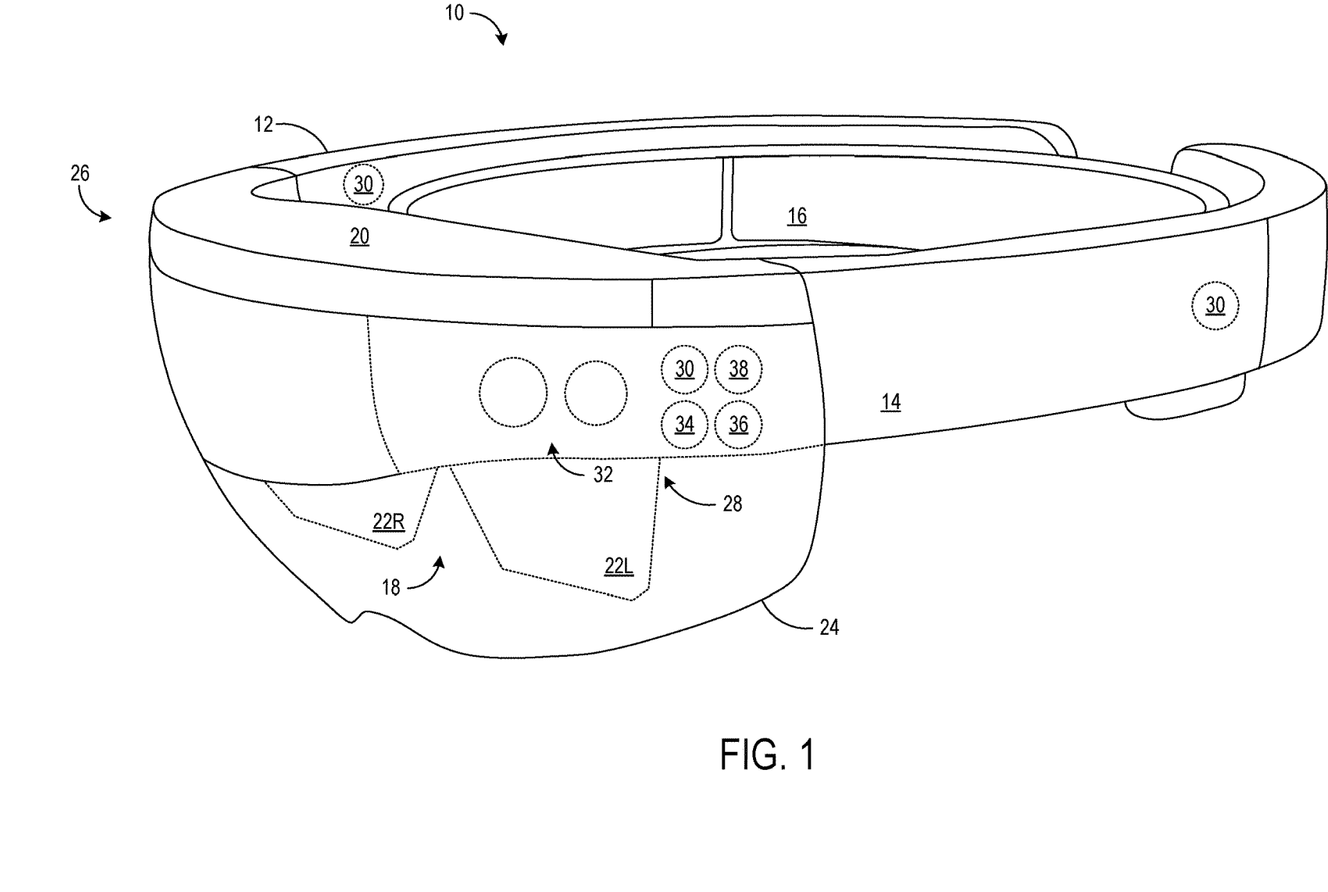
FIG. 1 shows a schematic illustration of a head-mounted display (HMD) device.

The secured sensor interface may be incorporated into any suitable device including or communicating with one or more sensors. FIG. 1 shows an example head-mounted display (HMD) device 10. The illustrated HMD device 10 takes the form of a wearable visor, but it will be appreciated that other forms are possible, such as glasses or goggles in other examples. The HMD device 10 includes a housing 12 having an outer band 14 and an inner band 16 to secure the device 10 to a user's head. The HMD device 10 includes a display 18 controlled by a controller 20. The display 18 may be configured to display stereoscopic images, and includes a left panel 22L and a right panel 22R. In other examples, a device may include a single display panel of a suitable shape. The HMD device 10 also includes a shield 24 attached to a front portion 26 of the housing 12 of the HMD device 10. The display 18 and/or the shield 24 may include one or more regions that are transparent, opaque, or semi-transparent. Any of these portions may further be configured to change transparency by suitable mechanism. As such, the HMD device 10 may be suited for both augmented reality scenarios and virtual reality scenarios.

The head-mounted display (HMD) device 10 comprises a sensor system 28 including one or more sensors, such as one or more thermal sensors 30, which may be disposed in different locations around the HMD device 10. Sensor system 28 may additionally or alternatively include one or more location sensors 32. Example location sensors include, but are not limited to, optical sensor(s) (e.g. depth camera(s) and/or RGB camera(s)), accelerometer(s), gyroscope(s), magnetometer(s), and global positioning system (GPS) sensors. The sensor system 28 may additionally or alternatively include other suitable sensors, such as a voltage/current sensor 34, an accelerometer/gyroscope 36, and a microphone/audio sensor 38. The sensors illustrated in FIG. 1 are exemplary in nature, and any additional or alternative sensors may be included in sensor system 28.

Figure 2:
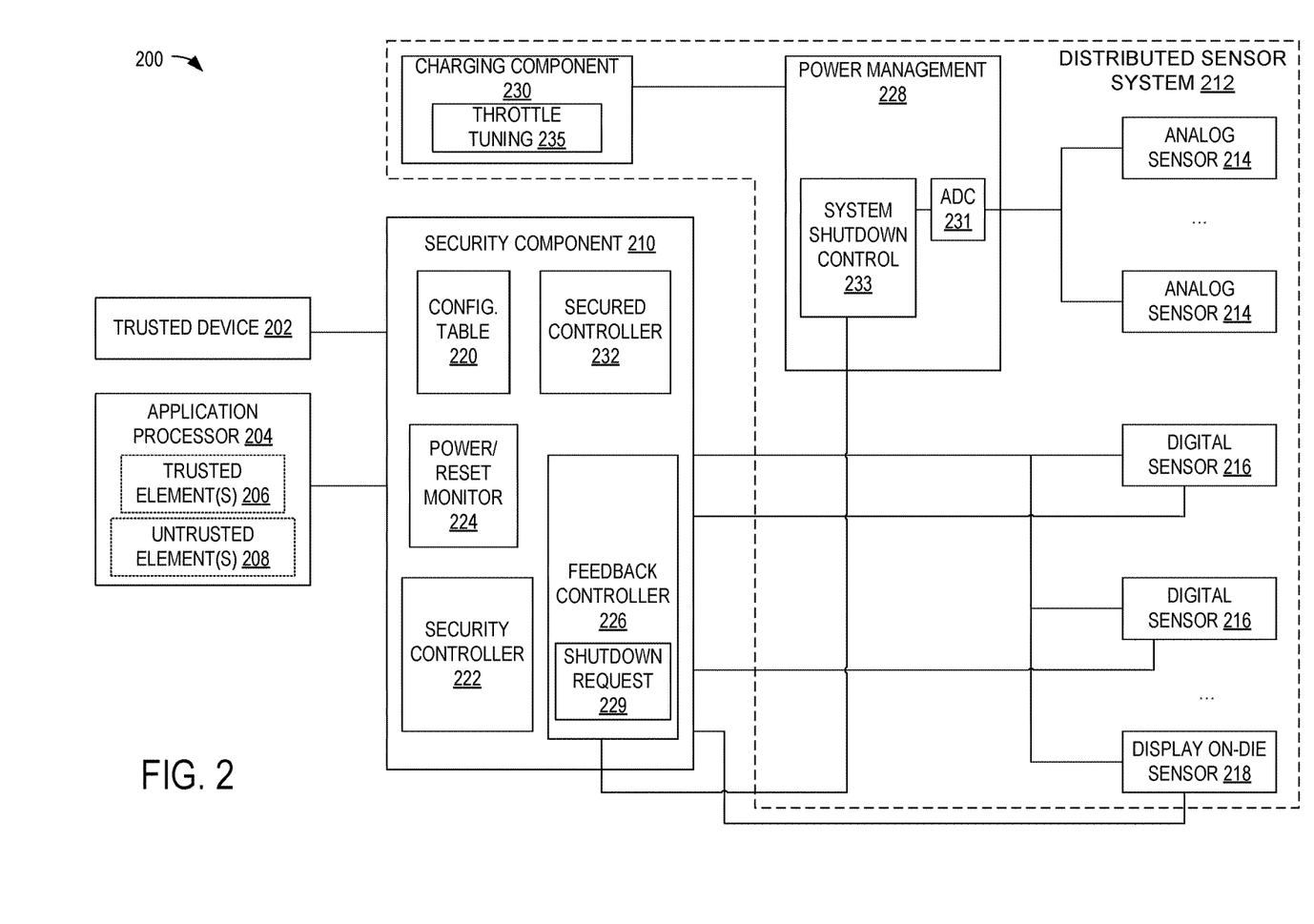
FIG. 2 is a block diagram of an example electronic device including a secured sensor interface.

FIG. 2 is a block diagram of an example electronic device 200. HMD device 10 is an example of electronic device 200. Other examples of electronic device 200 may include other wearable devices, mobile computing devices, personal computers, appliances, entertainment devices, and/or other electronic devices. Electronic device 200 may include one or more trusted devices 202, which may include components of a system-on-chip or other integrated circuits. Electronic device 200 may additionally or alternatively include an application processor 204 comprising trusted elements 206, as well as one or more untrusted elements 208. Application processor 204 may be an example of controller 20 of FIG.

1. Other components than the application processor 204 also may include trusted and untrusted components. A trusted device and/or trusted element may be considered to be trusted based on the device/element having been authenticated or otherwise authorized by a security component 210 located communicatively between the trusted elements, untrusted elements, and a distributed sensor system 212. The trusted device/element may be authorized to provide input to and/or change aspects of the security component 210 and the distributed sensor system 212, for example via one or more suitable authorization processes. In one example, a trusted device/element may be authenticated using a cryptographic authentication and authorization protocol and/or a source identifier.

The distributed sensor system 212 may include any suitable sensors. Examples include example one or more analog sensors 214, one or more digital sensors 216, one or more display on-die sensors 218, and/or any other suitable sensors. Such sensors may measure any suitable internal or environmental conditions, such as temperature, audio, voltage/current/power, pressure, vibrations, position, light, and humidity. The distributed sensor system 212 further may additionally or alternatively include sensors for capturing images and/or video. The distributed sensor system 212, the application processor 204, and/or the trusted devices 202 may communicate with the security component 210 via a link in some examples, such as an inter-integrated circuit (I2C), serial peripheral interface (SPI), or other communication link.

The security component 210 includes various modules for providing a secure interface between the trusted devices (e.g., the application processor 204) and the distributed sensor system 212. The security component 210 and the modules thereof may be implemented via any suitable hardware, examples of which are described in more detail below.

First, the security component 210 includes a configuration table 220 that stores configurations for the distributed sensor system in computer memory. Examples of such configurations include sensor limits for one or more of the sensors of the distributed sensor system (e.g. for comparing to sensor signals to control computing device operation), and programmable behaviors for the distributed sensor system. In some examples, two or more configurations may be stored for a sensor, depending upon how the sensor data is used by the computing device.

Information from the configuration table 220 may be communicated to the sensors of the distributed sensor system. The information from the configuration table may be communicated periodically, at startup, or on any other suitable basis. The communicated information from the configuration table 220 is stored in internal registers, for example, of the sensors of the distributed sensor system 212. Thus, the configuration table may be used to update configurations stored at the sensors to control behaviors of the sensors. As an example, the configurations stored at the sensors may control when the sensor sends an instruction to the trusted device (e.g., via the security component 210) to thereby control operation of the trusted device based on a sensed condition. As a more specific example, a thermal sensor may store a sensor limit which, if exceeded, triggers an instruction requesting a system shutdown or other suitable action to prevent overheating. The configuration table thus also may store a value corresponding to this sensor limit, which is used to update the sensor limit stored at the thermal sensor. In other examples, the sensor may be configured to send information indicating the sensed condition, such as a temperature value in the above scenario. In such examples, the security component may compare the information received from the sensor to the value stored in the configuration table to determine whether to trigger a power management response.

In either of these example scenarios (e.g., where sensed values are compared to values stored in the configuration table 220 and/or an internal register of the associated sensor), an unauthorized alteration of the configuration table 220 may affect operation of the electronic device 200. In order to prevent such unauthorized alteration, the configuration table 220 may be secured, such that access to the table is limited by a security controller 222 according to a selected security mechanism. Any suitable security protocol or combination of security protocols may be utilized to control access to the configuration table 220. In some examples, a one-time programmability mechanism may be used, in which the configuration information stored in the configuration table is stored in registers that are one-time programmable. In other words, the values of the configuration table are written once in non-volatile memory. Such programming may be performed at a manufacturing facility or in the field, and may provide a relatively higher level of restriction for further changes to the table. For this security mechanism and others described below, access control may be provided on a per-table, per-sensor, or per-memory location basis. In other words, using the one-time programmable protocol as an example, all values for the table may be set (written once in memory) at substantially the same time for a per-table scenario or individually for a per-sensor or per-memory location scenario.

In another example, a time-windowing modification protocol may be utilized in which configuration information may only be programmed within a predefined time period, for example, as measured from an event such as resetting the security component misted device/electronic device. As a more specific example, upon reset of electronic device 200, memory registers of the configuration table may be loaded with default values, and the register values are allowed to be modified (e.g., by any device or by an authorized device, depending on the security protocol) within a predefined time period (e.g., within a defined number of milliseconds from system boot or a defined number clock cycles based on a counter), after which the contents will be locked. The modified configuration information may be persistent until a next authorized change, or reloaded to default information after every reset. In this example, the security controller 222 may track the time and/or counter to determine when the time window has elapsed. Responsive to detecting that the time window has elapsed, the security controller 222 may prevent further changes to the table until a next reset or other power event.

The configuration table 220 may utilize locking-bit protection to control access to the table once the time window has elapsed to prevent modification of the configuration table values until the electronic device 200 is reset or powered down. A locking bit may be set globally for the configuration table, or may be set individually to represent a group of one or more values. This bit can be set to locked once (e.g., by the security controller 222), but cannot be unlocked until the next system reset that powers down the electronic device. The registers may remain configurable until the respective lock bit(s) are set.

The configuration table 220 may additionally or alternatively control access based on host and device authorization. For example, various components in a system-on-chip or other integrated circuit (e.g., trusted elements 206 and untrusted elements 208 of the application processor 204) may communicate using a network of buses (e.g., control and data buses) or a protocol on top of a physical bus (e.g., an Advance High-Performance Bus). The control bus or a part of the protocol may utilize a source identifier (ID) for the host (e.g., application processor 204) and a destination ID for the security component 210. The source ID and destination ID may determine the transfer of data from a source component to a destination component. When the source IDs are immutable and non-spoofable (e.g., sufficiently unique, hardcoded, and/or non-programmable), such IDs may serve as authenticating elements. The changing of limits in the configurable registers of the configuration table 220 thus may be restricted to certain entities within the system, such as the trusted elements of application processor 204, with matching whitelisted source IDs. This authentication may be used in conjunction with one or more other security protocols, such as time-windowing.

As described above, the security protocol controlling access to the configuration table 220 may be tied to a reset or power event. For example, the time-window for changing the values of the configuration table may be started in response to a reset or power event. In order to protect against unauthorized reset or power events, the security component 210 may include a power/reset monitor 224. The power/reset monitor 224 may monitor the system continuously or periodically and assert a "system shutdown" indication if a power/reset attack is detected. The power/reset monitoring may be performed in any suitable manner, such as via microcode or a hardware state machine that continually compares values in the configuration table 220 and values of registers of the sensors in the distributed sensor system 212 to monitor for changes. In another example, hardware signals (e.g., wires) may feed into the security component 210 by way of dedicated power/reset detector circuits. If an attack is detected (e.g., if the values between the configuration table and sensor are determined to be different), the security component 210 may issue a system shutdown instruction to power down the electronic device 200, even if none of the sensors has issued a shutdown instruction or provided a signal that would indicate a system shutdown (e.g., a sensed temperature that is above an associated temperature limit in the configuration table 220). Once a system shutdown from the security component is triggered, a reset or power down action may not clear the shutdown request until a specific authorized modification sequence is detected and accepted by the secured controller (e.g., during a time-windowing period). In this way, potential further attacks may be prevented once an initial attack is detected. The shutdown instruction in this example is independent of sensor status and is triggered by the attack detection (e.g., by the power/reset monitor 224).

Shutdown instructions generated by the security component 210 during an attack may be provided via a shutdown request module of a feedback controller 226 of the security component 210. The shutdown request module may send a shutdown request to power management component 228 (e.g., via a system shutdown control module 229 of the power management component). In response, the power management component 228 or feedback controller 226 may send an instruction to the charging component 230 to power down the electronic device 200.

Shutdown requests or other power changes for the electronic device 200 also may be generated based on signals from the sensors of the distributed sensor system 212 provided to the feedback controller 226. Signals from analog sensors 214 may first pass through an analog-to-digital converter 231 of power management component 228 (or other suitable analog-to-digital converter) for conversion to digital values before being passed to the feedback controller. The feedback controller 226 may be configured to analyze the signals from the sensors to determine feedback instructions for controlling operation of the electronic device 200. For example, if a thermal sensor output indicates that a temperature is above an associated threshold, the feedback instructions may comprise a shutdown request to prevent overheating. The feedback controller 226 may send the feedback instructions, such as a shutdown request or a charging component adjustment, to power management component 228 or charging component 230. Power management component 228 may, in response, shut down the electronic device via a system shutdown control 233 and/or adjust an amount and/or speed of charging of the electronic device (e.g., via a throttle tuning module 235 of the charging component 230).

Another security consideration for the electronic device 200 relates to the security of the signals transmitted between the sensors and the trusted devices. As an interface, the security component 210 may verify the signals from the sensors and/or trusted devices before passing the signals on to the associated destination (e.g., the trusted devices and/or the sensors). The signals from the distributed sensor system 212 and/or from the trusted devices 202 may be provided (e.g., via a link, such as an inter-integrated circuit (I2C), serial peripheral interface (SPI), or other communication interface) to a secured controller 232 of the security component for authentication. The secured controller 232 may authenticate the received signals as being sent from authorized devices, e.g., based on source IDs or other authentication protocol, before forwarding the signals to an associated destination, such as the feedback controller or application processor. In this way, signals received from unauthorized/untrusted elements may be ignored or used to trigger an attack prevention response, as described above.

Figure 3:
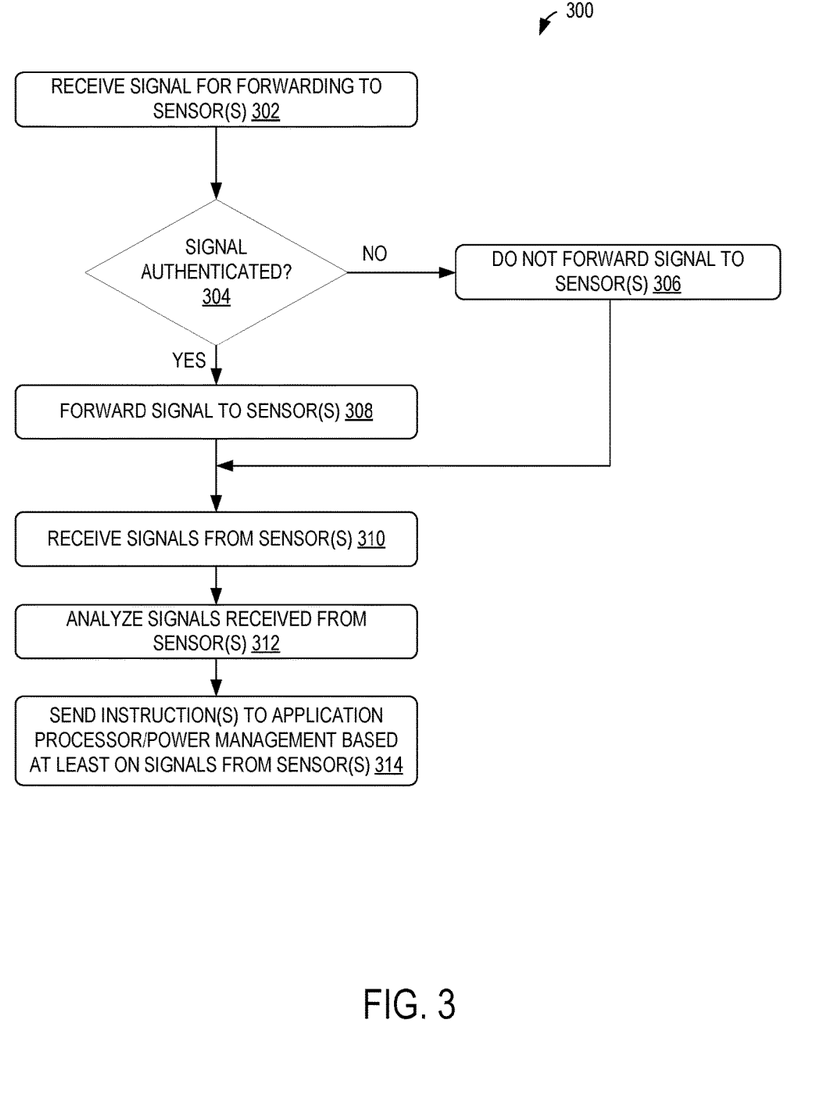
FIG. 3 is a flow chart of an example method for securing communications between components of an electronic device and a distributed sensor system of the device.

FIG. 3 shows a flow chart depicting an example method 300 of securing communications between components of an electronic device, such as electronic devices 10 and 200 of FIGS. 1 and 2). Method 300 may be implemented on any suitable computing device, including but not limited to those described with example to FIGS. 1 and 2. At 302, the method includes receiving a signal for forwarding to one or more sensors, for example by updating a configuration table that is accessed by the sensors, or by forwarding directly to one or more sensors. As one example, the signal may be received from an application processor to change configuration settings for the sensors. At 304, the method includes determining if the signal can be authenticated. As discussed above, the signal may be authenticated in response to determining that a source ID of the signal is associated with a trusted element. In other examples, any other suitable authentication method may be used. If the signal is not authenticated, the method does not forward the signal to the sensor(s), as indicated at 306. Conversely, if the signal is authenticated, the method forwards the signal to the sensor(s), at 308.

At 310, the method includes receiving signals from the sensor(s). The signals may include a sensor measurement, such as an absolute or relative temperature value, voltage/current value, decibel level, etc., and/or an instruction, such as a shutdown request, based on a sensor measurement. At 312, the method includes analyzing the signals received from the sensor(s), and at 314, sending instructions to the application processor, power management component, and/or charging component based at least on the analysis of the signals from the sensors. For example, where the signals from the sensors indicate that a temperature is over a threshold for the electronic device, the instructions may include feedback to a power management component requesting a system shutdown, a reduction in an amount and/or speed of charging being provided to the device via a charging component, or other suitable feedback. The feedback instructions may, in turn, be processed by the power management component, and power management instructions may be generated based on the feedback instructions. As examples, the power management instructions may instruct the power management component to shut down the electronic device or change the amount and/or speed of charging being provided to the device).

Figure 4:
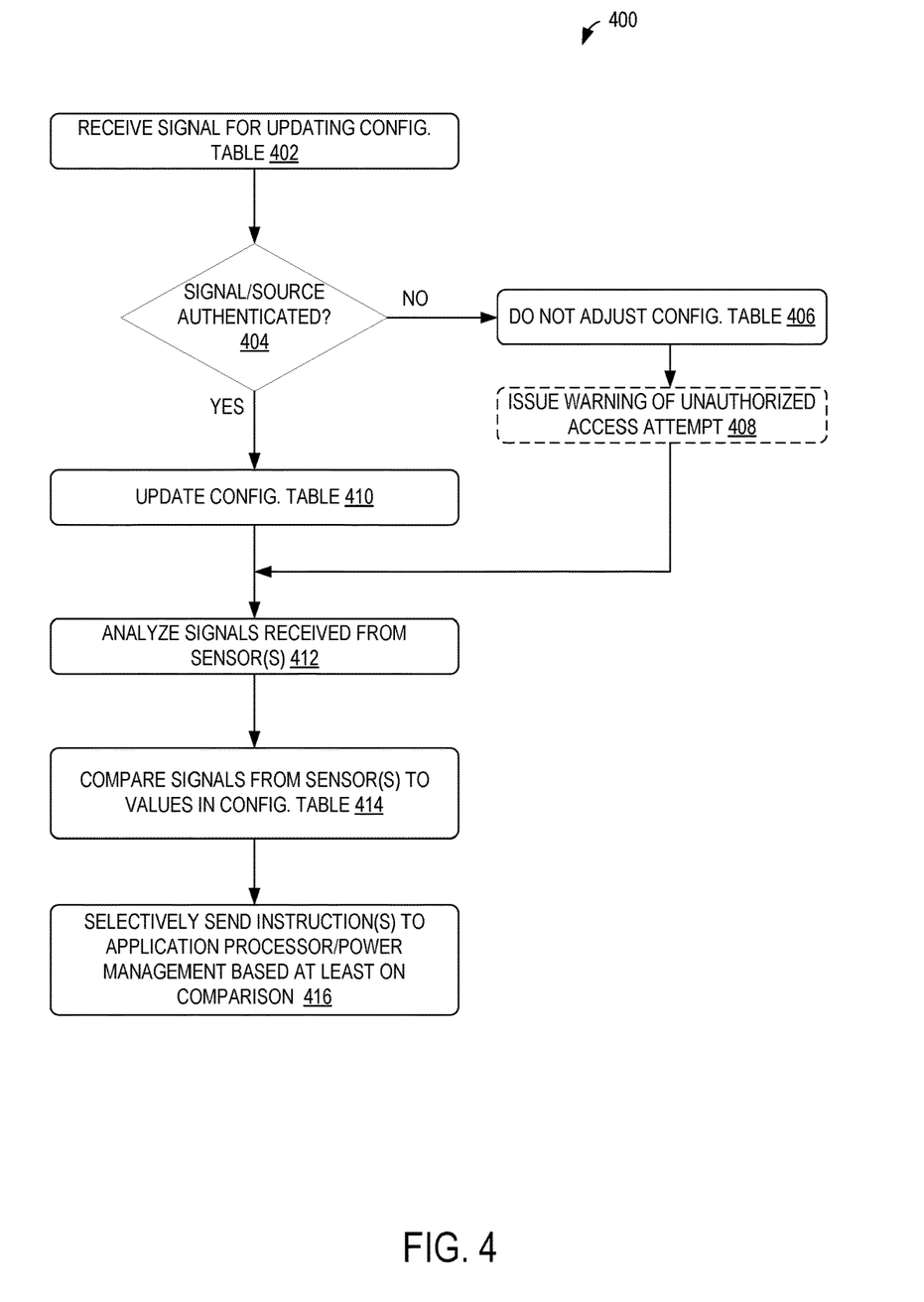
FIG. 4 is a flow chart showing an example method for securing a configuration table of a security component of an electronic device.

FIG. 4 shows a flow chart depicting an example method 400 for securing a configuration table of a security component (e.g., configuration table 220 of security component 210 of FIG. 2). At 402, the method includes receiving a signal for updating a configuration table. At 404, the method includes determining if the signal and/or the source of the signal can be authenticated, for example by authenticating a source ID associated with the signal as described above, or utilizing any other suitable authentication protocol. If the signal and/or the source of the signal cannot be authenticated (e.g. if the signal is received from an untrusted element), then the configuration table is not adjusted, as indicated at 406. The method may optionally further include issuing a warning of an unauthorized access attempt, as indicated at 408. The warning may trigger a protected shutdown of the device, as described with respect to FIG. 2 above, in which a specific security input is to be made to exit the protected shutdown. On the other hand, if the signal and/or source of the signal is authenticated (e.g. the signal is received from a trusted element), then the configuration table is updated in accordance with the signal, for example, based upon values encoded in the signal.

As mentioned above, additional security measures also may be applied, such as time-windowing. In such examples, the response used by the system to an unauthorized signal may vary depending upon the reason the signal is determined not to be authorized. For example, a signal from an untrusted element may trigger a warning, while a signal received from a trusted element but outside of a time window of modification may not trigger a warning, or trigger a different warning.

Continuing with FIG. 4, at 412, the method includes analyzing signals received from the sensors, and at 414 comparing the signals from the sensors to values in the configuration table. For example, sensor measurement values may be compared to associated measurement limits in the configuration table to determine whether a threshold has been exceeded. At 416, the method includes selectively sending instructions to an application processor, power management component or other suitable component based on the comparison. For example, if the comparison at 414 indicates that a measured value is above a threshold, a feedback controller may send an instruction to a power management component requesting shutdown of the device. Other suitable instructions also may be sent, such as an instruction to control a charging rate.

In some examples, the configuration table may include different thresholds for a given sensor, wherein each threshold corresponding to a different responsive action or instruction. For example, if a signal from the sensor is above a first threshold but below a second threshold, the feedback controller may send an instruction to the power management component to adjust a charging speed of the electronic device. Further, if the signal from the sensor is above both the first and second thresholds, the feedback controller may send an instruction to the power management component to shut down the electronic device.

Figure 5:
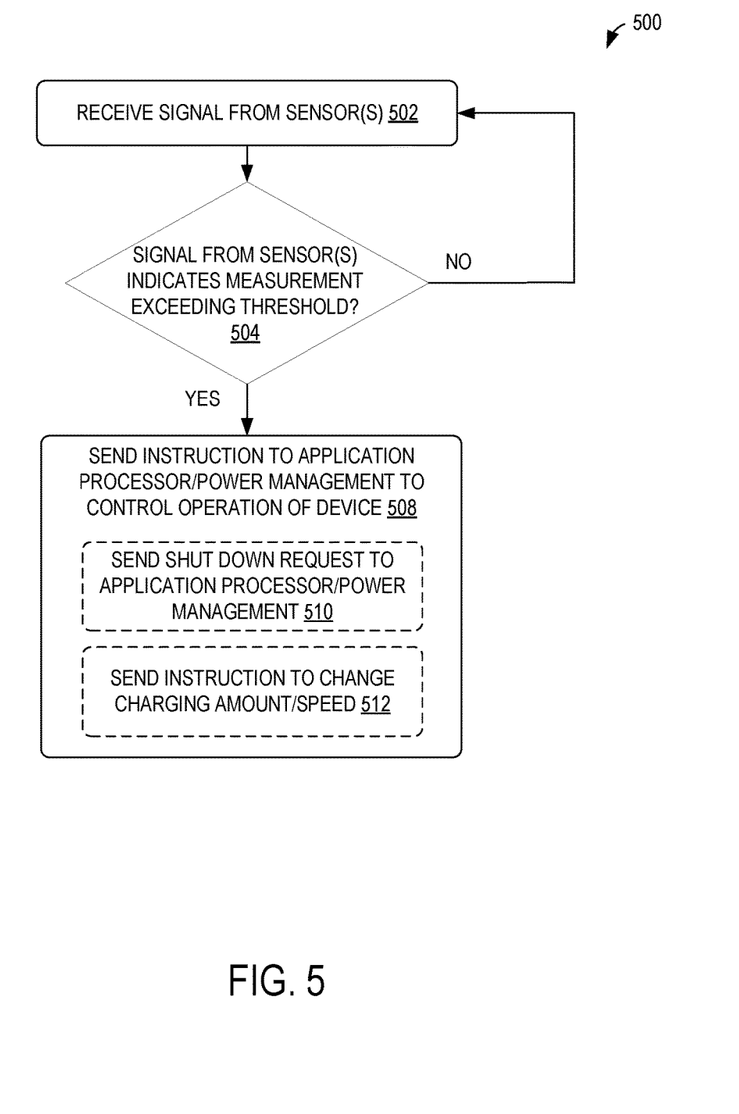
FIG. 5 is a flow chart showing an example method for controlling operation of an electronic device.

FIG. 5 shows a flow chart depicting an example method 500 for controlling operation of an electronic device (e.g., HMD device 10 of FIG. 1 and/or electronic device 200 of FIG. 2) based on signals from a distributed sensor system. At 502, the method includes receiving a signal from one or more sensors of the distributed sensor system, and at 504, determining if the signal from the sensors indicates that a measurement exceeds an associated threshold. If the measurement does not exceed the threshold, the method continues to receive and monitor the sensor data. On the other hand, if the measurement does exceed the threshold, then the method proceeds to 508 to send a feedback instruction to control operation of the device.

The feedback instruction sent at 508 may be configured to change operation of the device in any suitable manner, such as to cause the measurement to be within the threshold or to mitigate a security breach. For example, the feedback instruction may include a shutdown request that is sent to the application processor/power management component, as indicated at 510. As another example, the feedback instruction may include an instruction to change a charging amount and/or speed, as indicated at 512. As another example, if the sensor is an audio sensor, the instruction may include lowering a volume of output audio or displaying a warning to a user responsive to detecting that the output audio is above a threshold. As yet another example, if the sensor is a voltage/current sensor, the instruction may include an instruction to a power management/charging component to reduce a charging amount and/or speed or shut down the device responsive to determining that the voltage/current is above a threshold. Further, if the sensor is a vibration, pressure, or moisture sensor, the instruction may include an instruction to the power management/charging component to shut down the device to prevent damage.

The above-described methods and systems may provide a secured sensor interface to protect against unauthorized attempts to control operation of a device and/or unauthorized attempts to change responses to sensor signals. The secured sensor interface may be implemented in any suitable manner, such as by one or more storage devices (e.g., holding instructions executable by a processor), processors, field-programmable gate arrays (FPGAs), application-specific integrated circuits (ASICs), systems-on-chip (SoCs) and/or other hardware elements configured to secure communications between the distributed sensor system and the trusted devices/elements.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
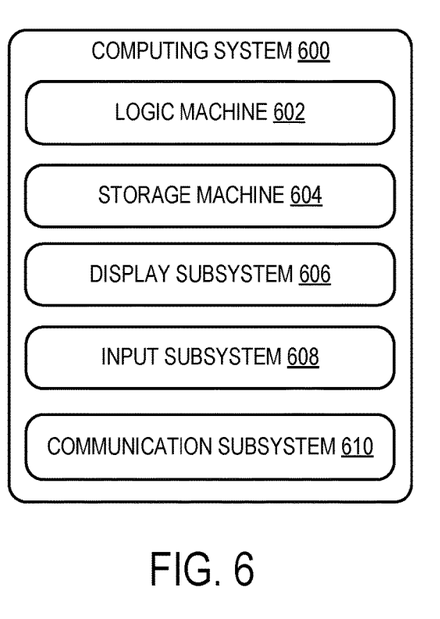
FIG. 6 is a block diagram of an example computing system.

FIG. 6 schematically shows a non-limiting embodiment of a computing system 600 that can enact one or more of the methods and processes described above. Computing system 600 is shown in simplified form. Computing system 600 may take the form of one or more head-mounted devices, mobile computing devices, mobile communication devices (e.g., smart phone), tablet computers, personal computers, server computers, home-entertainment computers, network computing devices, gaming devices, and/or other computing devices. For example, computing system 600 may include or be included in HMD device 10 of FIG. 1 and/or electronic device 200 of FIG. 2.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "module" may be used to describe an aspect of computing system 600 implemented to perform a particular function. In some cases, a module may be instantiated via logic machine 602 executing instructions held by storage machine 604. It will be understood that different modules may be instantiated from the same application, service, code block, object, library, routine, API, function, etc. Likewise, the same module may be instantiated by different applications, services, code blocks, objects, routines, APIs, functions, etc. The term "module" may encompass individual or groups of executable files, data files, libraries, drivers, scripts, database records, etc.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componently for assessing brain activity.

When included, communication subsystem 610 may be configured to communicatively couple competing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

Another example provides for a security component configured to be communicatively coupled between a trusted element and a distributed sensor system, the security component comprising a configuration table configured to store sensor configurations for the distributed sensor system, a security controller configured to secure the configuration table by limiting access to the configuration table according to a selected security protocol, and a feedback controller configured to receive signals from the distributed sensor system and send feedback instructions to the trusted element based at least on a comparison of the signals received from the distributed sensor system with values in the configuration table. Such an example may additionally or alternatively further include the security component, wherein the sensor configurations include one or more of sensor limits and programmable behaviors for the distributed sensor system. Such an example may additionally or alternatively include the security component, wherein the one or more feedback instructions from the feedback controller include a shutdown request in response to a signal from a thermal sensor indicating that the temperature is above a temperature threshold, the temperature threshold being based on the sensor configurations stored in the configuration table. Such an example may additionally or alternatively include the security component, wherein the selected security protocol includes a time-windowed modification protocol in which the stored sensor configurations are modifiable within a predefined time period and not modifiable outside of the predefined time period. Such an example may additionally or alternatively include the security component, wherein the predefined time period comprises a time period triggered by one or more of a reset and a power event. Such an example may additionally or alternatively include the security component, wherein the selected security protocol includes a locking-bit protection protocol that locks the stored sensor configurations in registers of the security component upon storing of the stored sensor configurations. Such an example may additionally or alternatively include the security component, wherein security component is configured to maintain the registers of the security component as locked until a reset or power event occurs. Such an example may additionally or alternatively include the security component, wherein the selected security protocol includes host and device authorization in which the stored sensor configurations are modifiable only by an authenticated device. Such an example may additionally or alternatively include the security component, wherein the feedback controller is further configured to detect an unauthorized modification event based on a comparison of values in the configuration table and values in registers of the distributed sensor system, and send a shutdown instruction to a power management component of the distributed sensor system responsive to detecting the unauthorized modification event comprising unauthorized modification of the configuration table. Such an example may additionally or alternatively include the security component, wherein the feedback controller is configured to clear the shutdown instruction only upon receipt of an authenticated request to clear the shutdown instruction. Such an example may additionally or alternatively include the security component, wherein the security component comprises one or more of a field-programmable gate array (FPGA), an application-specific integrated circuit (ASIC), and a component of a system-on-chip (SoC). Any or all of the above-described examples may be combined in any suitable manner in various implementations.

Another example provides for a method of securing a configuration table of a security component, the security component configured to be communicatively coupled between a trusted element and a distributed sensor system, the configuration table configured to include stored sensor configurations for the distributed sensor system, the method comprising receiving updated sensor configurations for the distributed sensor system, when the updated sensor configurations are received in compliance with a selected security protocol, then adjusting the stored sensor configurations in the configuration table based on the updated sensor configurations, when the updated sensor configurations are not received in compliance with the selected security protocol, not adjusting the stored sensor configurations in the configuration table, receiving signals from the distributed sensor system, and sending feedback instructions to the trusted element based at least a comparison of the signals received from the distributed sensor system with the stored sensor configurations in the configuration table. Such an example may additionally or alternatively include the method, wherein the distributed sensor system further includes a power management component and a charging component, and wherein the method further comprises, with the feedback controller, sending a power management instruction to the power management component for controlling the charging component. Such an example may additionally or alternatively include the method, wherein the distributed sensor system includes a plurality of thermal sensors and the stored sensor configurations include a temperature threshold for each of the plurality of thermal sensors, and wherein the signals received from the distributed sensor system include a signal from a first thermal sensor of the plurality of thermal sensors indicating that the temperature is above the temperature threshold for the first thermal sensor. Such an example may additionally or alternatively include the method, further comprising determining that the updated sensor configurations are received in compliance with the selected security protocol based at least partially upon the updated sensor configurations being received within a predetermined time period of a reset or power event of the security component or an associated electronic device. Such an example may additionally or alternatively include the method, further comprising determining that the updated sensor configurations are received in compliance with the selected security protocol based at least upon the updated sensor configurations being received from an authenticated device having a source identifier that has been authenticated using a cryptographic authentication and authorization protocol. Any or all of the above-described examples may be combined in any suitable manner in various implementations.

Another example provides for an electronic device comprising a distributed sensor system, a power management component, a trusted element, and a security component disposed communicatively between the distributed sensor system and the trusted element such that all electronic communication between the distributed sensor system and the trusted element passes through the security component, the security component comprising a configuration table configured to store sensor configurations for the distributed sensor system, a security controller for securing the configuration table by limiting access to the configuration table according to a selected security protocol, and a feedback controller configured to receive signals from the distributed sensor system and send feedback instructions to one or more of the trusted element and the power management component based at least on a comparison of the signals received from the distributed sensor system with values in the configuration table. Such an example may additionally or alternatively include the electronic device, wherein the selected security protocol includes a time-windowed modification protocol in which the stored sensor configurations are modifiable within a predefined time period and not modifiable outside of the predefined time period. Such an example may additionally or alternatively include the electronic device, wherein the selected security protocol includes a locking-bit protection protocol in which, upon storing or within a predetermined time period of storing, the stored sensor configurations are set in registers and locked until a reset or power event. Such an example may additionally or alternatively include the electronic device, further comprising an application processor including the trusted element and one or more untrusted elements. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A security component disposed communicatively between a trusted element of an application processor and a distributed sensor system of an electronic device, the distributed sensor system comprising a power management component, the security component comprising:
   a configuration table in which sensor configurations for the distributed sensor system are stored, the sensor configurations comprising one or more sensor limits for one or more sensors of the distributed sensor system, the one or more sensor limits defining limits to which to compare sensor signals for controlling operation of the power management component of the distributed sensor system;
   a security controller configured to secure the configuration table by limiting access to the configuration table according to a selected security protocol; and
   a feedback controller configured to receive signals from the distributed sensor system and send feedback instructions to one or more of the power management component and the trusted element of the application processor based at least on a comparison of the signals received from the distributed sensor system with values in the configuration table, the feedback controller being further configured to compare a sensor limit stored in the configuration table to a value stored in a register of a sensor of the distributed sensor system, and take an action comprising a system shutdown to prevent a possible attack when the sensor limit in the configuration table and the value stored in the register of the sensor differ.

2. The security component of claim 1, wherein the sensor configurations include one or more of sensor limits and programmable behaviors for the distributed sensor system.

3. The security component of claim 1, wherein the selected security protocol includes a time-windowed modification protocol in which the stored sensor configurations are modifiable within a predefined time period and not modifiable outside of the predefined time period.

4. The security component of claim 3, wherein the predefined time period comprises a time period triggered by one or more of a reset and a power event.

5. The security component of claim 1, wherein the selected security protocol includes a locking-bit protection protocol that locks the stored sensor configurations in registers of the security component upon storing of the stored sensor configurations.

6. The security component of claim 5, wherein the security component is configured to maintain the registers of the security component as locked until a reset or power event occurs.

7. The security component of claim 1, wherein the selected security protocol includes host and device authorization in which the stored sensor configurations are modifiable only by an authenticated device.

8. The security component of claim 1, wherein the feedback controller is further configured to detect an unauthorized modification event based on a comparison of values in the configuration table and values in registers of the distributed sensor system, and send a shutdown instruction to the power management component of the distributed sensor system responsive to detecting the unauthorized modification event comprising unauthorized modification of the configuration table.

9. The security component of claim 8, wherein the feedback controller is configured to clear the shutdown instruction only upon receipt of an authenticated request to clear the shutdown instruction.

10. The security component of claim 1, wherein the security component comprises one or more of a field-programmable gate array (FPGA), an application-specific integrated circuit (ASIC), and a component of a system-on-chip (SoC).

11. A method of securing a configuration table of a security component, the security component disposed communicatively between a trusted element of an application processor and a distributed sensor system of an electronic device, the distributed sensor system comprising a power management component, the configuration table storing sensor configurations for the distributed sensor system, the method comprising:
   receiving updated sensor configurations for the distributed sensor system;
   when the updated sensor configurations are received in compliance with a selected security protocol, the selected security protocol comprising time windowing in which the stored sensor configurations are modifiable only by an authenticated device within a predefined time period, then adjusting the stored sensor configurations in the configuration table based on the updated sensor configurations, the stored sensor configurations comprising one or more sensor limits for one or more sensors of the distributed sensor system, the sensor limits defining limits to which to compare sensor signals for controlling operation of the power management component of the distributed sensor system;
   when the updated sensor configurations are not received in compliance with the selected security protocol, not adjusting the stored sensor configurations in the configuration table;
   receiving signals from the distributed sensor system;
   comparing the signals received from the distributed sensor system to the limits defined by the sensor limits of the stored sensor configurations in the configuration table;
   sending feedback instructions to the one or more of the power management component and the trusted element of the application processor based at least on comparing the signals received from the distributed sensor system with the stored sensor configurations in the configuration table;
   comparing a sensor limit stored in the configuration table to a value stored in a register of a sensor of the distributed sensor system; and
   sending instructions for a system shutdown to prevent a possible attack when the sensor limit in the configuration table and the value stored in the register of the sensor differ.

12. The method of claim 11, wherein the distributed sensor system further includes a charging component, and wherein the method further comprises, with the feedback controller, sending a power management instruction to the power management component for controlling the charging component.

13. The method of claim 11, wherein the distributed sensor system includes a plurality of thermal sensors and the stored sensor configurations include a temperature threshold for each of the plurality of thermal sensors, and wherein the signals received from the distributed sensor system include a signal from a first thermal sensor of the plurality of thermal sensors indicating that the temperature is above the temperature threshold for the first thermal sensor.

14. The method of claim 11, further comprising determining that the updated sensor configurations are received in compliance with the selected security protocol based at least partially upon the updated sensor configurations being received within a predetermined time period of a reset or power event of the security component or the associated electronic device.

15. The method of claim 14, further comprising determining that the updated sensor configurations are received in compliance with the selected security protocol based at least upon the updated sensor configurations being received from an authenticated device having a source identifier that has been authenticated using a cryptographic authentication and authorization protocol.

16. An electronic device comprising:
a distributed sensor system;
a power management component;
an application processor comprising a trusted element; and
a security component disposed communicatively between the distributed sensor system and the trusted element of the application processor such that all electronic communication between the distributed sensor system and the trusted element of the application processor passes through the security component, the security component comprising
a configuration table in which sensor configurations for the distributed sensor system are stored, the sensor configurations comprising one or more sensor limits for one or more sensors of the distributed sensor system, the one or more sensor limits defining limits to which to compare sensor signals for controlling operation of the power management component;
a security controller for securing the configuration table by limiting access to the configuration table according to a selected security protocol; and
a feedback controller configured to receive signals from the distributed sensor system and send feedback instructions to one or more of the trusted element of the application processor and the power management component based at least on a comparison of the signals received from the distributed sensor system with values in the configuration table, the feedback controller being further configured to compare a sensor limit stored in the configuration table to a value stored in a register of a sensor of the distributed sensor system, and take an action comprising a system shutdown to prevent a possible attack when the sensor limit in the configuration table and the value stored in the register of the sensor differ.

17. The electronic device of claim 16, wherein the selected security protocol includes a time-windowed modification protocol in which the stored sensor configurations are modifiable within a predefined time period and not modifiable outside of the predefined time period.

18. The electronic device of claim 16, wherein the selected security protocol includes a locking-bit protection protocol in which, upon storing or within a predetermined time period of storing, the stored sensor configurations are set in registers and locked until a reset or power event.

19. The electronic device of claim 16, wherein the application processor includes one or more untrusted elements.

* * * * *